(12) United States Patent
Sawada et al.

(10) Patent No.: US 8,119,248 B2
(45) Date of Patent: Feb. 21, 2012

(54) ORGANIC-INORGANIC HYBRID FREE STANDING FILM, AND ITS PRODUCTION METHOD

(75) Inventors: Makoto Sawada, Kanagawa (JP); Taisei Nishimi, Kanagawa (JP); Jiro Tsukahara, Kanagawa (JP); Shuuji Kanayama, Kanagawa (JP); Ritsuko Morita, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 251 days.

(21) Appl. No.: 12/433,512

(22) Filed: Apr. 30, 2009

(65) Prior Publication Data

US 2009/0274842 A1    Nov. 5, 2009

(30) Foreign Application Priority Data

Apr. 30, 2008  (JP) ................. 2008-118651

(51) Int. Cl.
*B05D 3/00*    (2006.01)

(52) U.S. Cl. ............... 428/446; 428/500; 427/385.5
(58) Field of Classification Search .......... 264/216; 427/385; 428/446, 500
See application file for complete search history.

(56) References Cited

U.S. PATENT DOCUMENTS 5,190,698 A * 3/1993 Coltrain et al. .......... 252/519.33
5,412,016 A * 5/1995 Sharp .......................... 524/430

FOREIGN PATENT DOCUMENTS

JP    07247464 A  *  9/1995
JP    10-306109       11/1998

OTHER PUBLICATIONS

JP 07247464 A, Sep. 1995, Machine translation.*
Richard Vendamme et al., "Robust free-standing nanomembranes of organic/inorganic interpenetrating networks", Published online May 21, 2006, Nature Publishing Group 2006, Nature materials, vol. 5, Jun. 2006, pp. 494-501.

* cited by examiner

*Primary Examiner* — Satya Sastri
(74) *Attorney, Agent, or Firm* — Young & Thompson

(57) ABSTRACT

A free standing film having excellent mechanical strength and flexibility as well as sufficient area is provided. The organic-inorganic hybrid free standing film includes an organic polymer having a constitutional repeating unit derived from a monomer represented by general formula (1) and a hydrolytic condensate of a metal alkoxide.

4 Claims, 4 Drawing Sheets

ORGANIC-INORGANIC HYBRID FREE STANDING FILM, AND ITS PRODUCTION METHOD

BACKGROUND OF THE INVENTION

This invention relates to an organic-inorganic hybrid free standing film and its production process. More specifically, this invention relates to an organic-inorganic hybrid free standing film containing an organic polymer containing a constitutional repeating unit derived from a particular monomer and a hydrolytic condensate of a metal alkoxide as its main components, and its production process.

Free standing thin films (hereinafter also referred to as free standing films) having a thickness in the order of nanometer to micrometer have recently provoked a growing attention since they are one of important materials whose commercialization is sincerely awaited in various advanced fields such as electronics, environment, and life sciences. Exemplary applications include reverse osmosis membrane used in producing fresh water from sea water, separator membrane used in separating gas and ion, and structural member of sensor and display device.

However, production of a free standing film having its thickness controlled to the degree of nanometer is quite difficult and risk of defects such as pin holes increases with the decrease in the film thickness. A free standing film with reduced thickness is also like to suffer from problems such as brittleness and insufficient strength. As a means to produce a free standing film having sufficient mechanical strength and flexibility, Vendamme, R. et al. (Vendamme, R. et al. "Robust free-standing nanomembranes of organic/inorganic interpenetrating networks", Nature materials, 2006, vol. 5, pp. 494-501) proposes use of a hybrid film of an organic polymer and an inorganic compound, namely, the so-called organic-inorganic hybrid thin film. According to JP 10-306109 A, an "organic-inorganic hybrid material" means a novel material which is provided with the excellent heat resistance and mechanical strength of the inorganic compound as well as the excellent flexibility and chemical properties of the organic compound. In Vendamme, R. et al., a thin film having a thickness in the order of nanometer is formed by spin coating a mixture of a monomer having hydroxy group and a zirconia precursor to simultaneously promote radical polymerization of the monomer and hydrolytic condensation of the zirconia precursor.

SUMMARY OF THE INVENTION

However, Vendamme, R. et al. reports the presence of zirconia oxide domain of several dozen nanometers in size in the resulting free standing film. In other words, dispersibility of the organic component and the inorganic component in the free standing film has not necessarily been satisfactory, and further improvement has been desired.

Vendamme, R. et al. only refers to a particular monomer having hydroxy group, and it does not indicate the effects on other functional monomers. The inventors of the present invention examined the method described in Vendamme, R. et al. for various functional monomers and as a result found that the organic polymer and the inorganic compound were often not miscible with each other to form a structure associated with phase separation, so that the film obtained did not have sufficient mechanical strength. When a free standing film was produced by using the monomer having hydroxy group with the functional monomer, the resulting free standing film was brittle and easily cracked, and production of a free standing film having a sufficient area (size) was difficult.

In view of the situation as described above, it is an object of the present invention to provide a free standing film having excellent mechanical strength and flexibility and which has sufficient area (size), and a method for producing a free standing film which can be used for various functional monomers.

The inventors of the present invention examined the reason why the desired effects are not realized by the conventional methods, and made an intensive investigation for promoting the interaction between the organic component and the inorganic component. It was then found that use of a monomer having a particular functional group enables production of an organic-inorganic hybrid free standing film having sufficient mechanical strength and flexibility. The present invention has been completed on the bases of such finding.

Accordingly, the inventors of the present invention found that the problems as described above can be solved by the following [1] to [7].

[1] An organic-inorganic hybrid free standing film comprising an organic polymer having a constitutional repeating unit derived from a monomer represented by general formula (1):

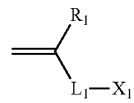

General formula (1)

wherein $R_1$ represents hydrogen atom or an alkyl group, $L_1$ represents a divalent linkage group or direct linkage, and $X_1$ represents carboxyl group, an acidic group containing phosphorus atom represented by the general formula (A):

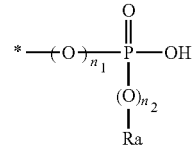

General formula (A)

wherein Ra represents hydrogen atom, a substituent containing no polymerizable group, or Ac—O—Y—, $n_1$ and $n_2$ independently represent an integer of 0 or 1, * indicates binding position with the $L_1$, Ac represents an acryloyl group or a methacryloyl group, Y represents an alkylene group, an alkyleneoxy group, an alkyleneoxycarbonyl group, an alkylenecarbonyl group, or a combination of such groups, or an acidic group containing sulfur atom represented by the general formula (B):

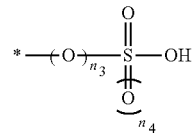

General formula (B)

wherein $n_3$ and $n_4$ independently represent an integer of 0 or 1, and * indicates binding position with the $L_1$; and a hydrolytic condensate of a metal alkoxide.

[2] An organic-inorganic hybrid free standing film according to [1] wherein the metal atom in the metal alkoxide is at least one metal atom selected from the group consisting of silicon, titanium, zirconium, aluminum, tin, and iron.

[3] An organic-inorganic hybrid free standing film according to [1] wherein the organic-inorganic hybrid free standing film has a thickness of 10 nm to 3 μm.

[4] A method for producing an organic-inorganic hybrid free standing film of [1] comprising the steps of
coating a solution containing
a monomer represented by the by general formula (1):

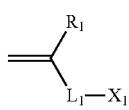

General formula (1)

wherein $R_1$ represents hydrogen atom or an alkyl group, $L_1$ represents a divalent linkage group or direct linkage, and $X_1$ represents carboxyl group, an acidic group containing phosphorus atom represented by the general formula (A):

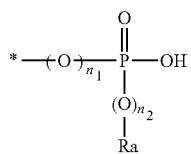

General formula (A)

wherein Ra represents hydrogen atom, a substituent containing no polymerizable group, or Ac—O—Y—, $n_1$ and $n_2$ independently represent an integer of 0 or 1, * indicates binding position with the $L_1$, Ac represents an acryloyl group or methacryloyl group, Y represents an alkylene group, an alkyleneoxy group, an alkyleneoxycarbonyl group, an alkylenecarbonyl group, or a combination of such groups, or an acidic group containing sulfur atom represented by the general formula (B):

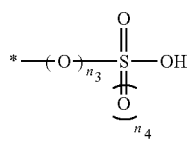

General formula (B)

wherein $n_3$ and $n_4$ independently represent an integer of 0 or 1, and * indicates binding position with the $L_1$, and
a metal alkoxide and/or its partial hydrolytic condensate on a substrate to form a film;
curing the film; and
peeling the cured film from the substrate to obtain the organic-inorganic hybrid free standing film.

[5] A method for producing an organic-inorganic hybrid free standing film according to [4] wherein the substrate has a peel assist layer on its surface.

[6] A method for producing an organic-inorganic hybrid free standing film according to [4] wherein the solution containing a monomer represented by the general formula (1) and a metal alkoxide and/or its partial hydrolytic condensate is a solution containing a non-aqueous solvent.

[7] An organic-inorganic hybrid free standing film produced by a method comprising the steps of
coating a solution containing
a monomer represented by the by general formula (1):

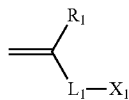

General formula (1)

wherein $R_1$ represents hydrogen atom or an alkyl group, $L_1$ represents a divalent linkage group or direct linkage, and $X_1$ represents carboxyl group, an acidic group containing phosphorus atom represented by the general formula (A):

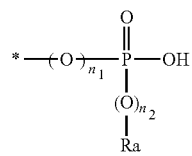

General formula (A)

wherein Ra represents hydrogen atom, a substituent containing no polymerizable group, or Ac—O—Y—, $n_1$ and $n_2$ independently represent an integer of 0 or 1, * indicates binding position with the $L_1$, Ac represents an acryloyl group or methacryloyl group, Y represents an alkylene group, an alkyleneoxy group, an alkyleneoxycarbonyl group, an alkylenecarbonyl group, or a combination of such groups, or an acidic group containing sulfur atom represented by the general formula (B):

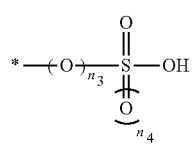

General formula (B)

wherein $n_3$ and $n_4$ independently represent an integer of 0 or 1, and * indicates binding position with the $L_1$, and
a metal alkoxide and/or its partial hydrolytic condensate on a substrate to form a film;
curing the film; and
peeling the cured film from the substrate to obtain the organic-inorganic hybrid free standing film.

The present invention has enabled to provide a free standing film having excellent mechanical strength and flexibility as well as sufficient area, and a method for producing a free standing film which can be used for various functional monomers.

BRIEF DESCRIPTION OF THE DRAWINGS

FIG. 6B is a picture at a higher magnification of the area indicated by frame A in FIG. 6A.

FIG. 7B is a picture at a higher magnification of the area indicated by frame A in FIG. 7A.

DETAILED DESCRIPTION OF THE INVENTION

Figure 1:
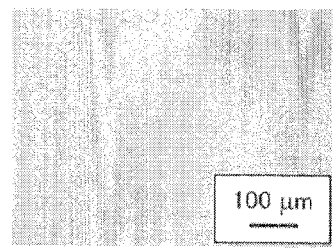
FIG. 1 is a picture taken by an optical microscope for the surface of the free standing film obtained in Example 1.

Next, various embodiments of the present invention are described.

The organic-inorganic hybrid free standing film according to the present invention mainly comprises an organic polymer having a constitutional repeating unit derived from a monomer represented by general formula (1) and a hydrolytic condensate of a metal alkoxide (inorganic compound). Usually, an organic polymer and an inorganic compound are hardly miscible, and it would be difficult to obtain a useful material by merely mixing these components. The idea of "organic-inorganic hybrid" used in the present invention is synthesis of a material having the properties of both materials by combining an organic component such as an organic polymer with an inorganic component such as hydrolytic condensate of a metal alkoxide. More specifically, production of a useful material having optical transparency is expected by mixing an organic component and an inorganic component at nano scale less than the wavelength of light (up to about 750 nm).

Next, the monomer represented by the general formula (1), the metal alkoxide and its partial hydrolytic condensate, and the like used in the present invention are described in detail.

[The Monomer Represented by the General Formula (1)]

The organic-inorganic hybrid free standing film according to the present invention contains an organic polymer having a constitutional repeating unit derived from a monomer represented by general formula (1). The constitutional repeating unit derived from a monomer represented by general formula (1) in the organic polymer is represented by the general formula (2).

[Chemical formula]

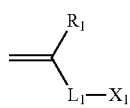

General formula (1)

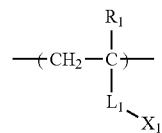

General formula (2)

In the general formula (1), $R_1$ represents hydrogen atom or an alkyl group, $L_1$ represents a divalent linkage group or direct linkage, and $X_1$ represents carboxyl group, an acidic group containing phosphorus atom represented by the general formula (A), or acidic group containing sulfur atom represented by the general formula (B).

The polymer may contain two ore more types of the constitutional repeating unit derived from the monomer represented by general formula (1).

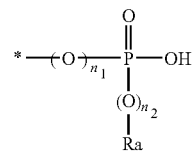

General formula (A)

In the general formula (A), Ra represents hydrogen atom, a substituent containing no polymerizable group, or Ac—O—Y—, $n_1$ and $n_2$ independently represent an integer of 0 or 1, * indicates binding position with the $L_1$, Ac represents an acryloyl group or a methacryloyl group, Y represents an alkylene group, an alkyleneoxy group, an alkyleneoxycarbonyl group, an alkylenecarbonyl group, or a combination of such groups.

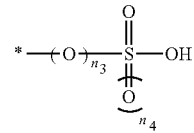

General formula (B)

In the general formula (B), $n_3$ and $n_4$ independently represent an integer of 0 or 1, and * indicates binding position with the $L_1$.

In the general formula (1), $R_1$ represents hydrogen atom or an alkyl group preferably containing 1 to 20 carbon atoms, more preferably containing 1 to 10 carbon atoms, and most preferably containing 1 to 3 carbon atoms. The alkyl group may be branched or substituted with a hetero atom, and the alkyl group may also include an unsaturated bond. Exemplary alkyl groups include methyl group, ethyl group, propyl group, and isopropyl group, and $R_1$ is more preferably hydrogen atom or methyl group.

In the general formula (1), $L_1$ represents a divalent linkage group or direct linkage. Exemplary divalent linkage groups include an alkylene group preferably containing 1 to 20 carbon atoms, and more preferably containing 1 to 10 carbon atoms such as methylene group, ethylene group, propylene group, butylene group, pentylene group, and hexylene group, —O—, —S—, an arylene group such as phenylene group, —CO—, —NH—, —SO$_2$—, —COO—, —CONH—, —C≡C—, —N=N—, and a group formed by combining these groups such as an alkyleneoxy group, an alkyleneoxy carbonyl group, and an alkylene carbonyloxy group.

Among these, the preferred are —O—, an alkylene group, —CONH—, —COO—, an arylene group, and a group formed by combining these groups. When $L_1$ is direct linkage, $X_1$ and C in the general formula (1) is directly bonded.

In the general formula (1), $X_1$ represents carboxyl group, an acidic group containing phosphorus atom represented by the general formula (A), or an acidic group containing sulfur atom represented by the general formula (B).

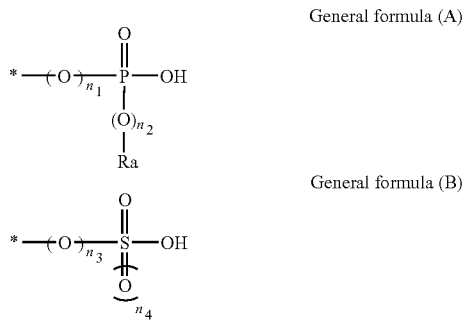

General formula (A)

General formula (B)

In the general formula (A), Ra represents hydrogen atom, a substituent containing no polymerizable group, or Ac—O—Y—. Exemplary substituents containing no polymerizable group include an alkyl group, an alkoxy group, an aryl group, an aryloxy group, or a group formed by combining these groups. The preferred are an alkyl group and an alkoxy group, and the more preferred is an alkoxy group.

The alkyl group is preferably the one containing 1 to 12 carbon atoms, more preferably 1 to 9 carbon atoms, and still more preferably 1 to 6 carbon atoms. Exemplary alkyl groups include methyl group, ethyl group, propyl group, butyl group, pentyl group, and hexyl group. The alkyl group may be a straight, a branched, or a cyclic alkyl group, and the preferred is a straight alkyl group, and the alkyl group may be optionally substituted with an alkoxy group, an aryl group, or an aryloxy group.

The aryl group is preferably the one containing 6 to 14 carbon atoms, and more preferably the one containing 6 to 10 carbon atoms. Exemplary aryl groups include phenyl group, 1-naphthyl group, and 2-naphthyl group, and the aryl group may be optionally substituted with an alkyl group, an alkoxy group, or an aryloxy group.

The alkyl moiety of the alkoxy group and the aryl moiety of the aryloxy group may be as defined above for the alkyl group and the aryl group.

When Ra represents Ac—O—Y— in the general formula (A), Ac may be an acryloyl group or a methacryloyl group, and Ac is preferably a methacryloyl group.

Y is an alkylene group, an alkyleneoxy group, an alkylene oxycarbonyl group, an alkylene carbonyl group, or a group comprising a combination of such groups preferably containing 1 to 12 carbon atoms, more preferably 1 to 6 carbon atoms, and most preferably 1 to 4 carbon atoms. When Y is an alkyleneoxy group, an alkyleneoxy carbonyl group, or an alkylene carbonyloxy group, the alkylene moiety may be, for example, methylene group, ethylene group, propylene group, butylene group, pentylene group, or hexylene group. The alkylene group may be either a straight group or a branched group, and the preferred is a straight alkylene group.

O in the Ac—O—Y— represents oxygen atom.

In the general formula (A), $n_1$ and $n_2$ are independently an integer of 0 or 1, and $n_1$ is preferably 1 and $n_2$ is preferably 1. For example, when $n_1$ is 1 and $n_2$ is 1, and R is hydrogen atom, the general formula (A) represents —O—PO(OH)$_2$ (phosphate group). The general formula (A) may also represent —O—PO(OR)OH (phosphoric acid ester group).

In the general formula (B), $n_3$ and $n_4$ independently represent an integer of 0 or 1, and $n_3$ is preferably 0 and $n_4$ is preferably 1. For example, when $n_3$ is 1 and $n_4$ is 1, the general formula (B) represents —O—S(O)$_2$OH, and when $n_3$ is 1 and $n_4$ is 0, the general formula (B) represents —O—S(O)OH.

In the general formula (1), $X_1$ is preferably an acidic group containing phosphorus atom represented by the general formula (A) in view of high dispersibility of the organic polymer and the inorganic compound in the resulting free standing film. The acidic group containing phosphorus atom represented by the general formula (A) may also be in the state having the hydrogen atom dissociated or in the state of a salt.

In most cases, the functional group represented by the $X_1$ is preferably the one having a relatively low acid dissociation constant (pKa), namely, a pKa of preferably up to 10, and more preferably up to 3. While no limit is particularly set for the lower limit, the pKa is preferably at least −10. It is to be noted that the pKa is the value measured in water at 25° C. As an example of the functional group represented by the $X_1$, R—O—P(=O)(—OH)$_2$ has a pKa of 2 to 3 (the first acid dissociation constant), and R—COOH has a pKa of 4 to 5. On the other hand, R—OH has a pKa of 15 to 16. Although the detailed mechanism is unknown, use of a functional group having a low pKa results in the reduced occurrence of cracks in the resulting free standing film. This is presumably due to the promotion of the interaction between the organic polymer and the inorganic compound in the free standing film which results in the prevention of the phase separation between the organic component and the inorganic component, and hence, in the improved dispersibility. It is to be noted that the pKa value is a value represented according to the definition, for example, in Sawaki, Y, "Basic Chemistry Course: Physical Organic Chemistry" (1999, Maruzen) pages 47 to 60, and the pKa values for various compounds are described, for example, in M. B. Smith and J. March, "March's Advanced Organic Chemistry 5th edition" (2001, John Wiley & Sons) page 329, Table 8.1, and the references cited therein, and the pKa value of the substituent is derived from these descriptions. The pKa value not described in these references may be determined according to the definition of the pKa value by using the method described in "Experimental Chemistry, Fourth Edition, vol. 1 Basic Procedures I" edited by The Chemical Society of Japan, page 115 (1990, Maruzen). The pKa value of a weak acid may also be obtained by determining the relative value using the method described in Sawaki, Y, "Basic Chemistry Course: Physical Organic Chemistry" page 50 (1999, Maruzen). The pKa value differs by the environment such as the solvent, and therefore, it may also be determined by the method described in The Chemical Society of Japan ed. "Experimental Chemistry, Fourth Edition, vol. 9 Electricity and Magnetism" page 286 (1991, Maruzen). The pKa value of the substituent in a compound is greatly affected by the structure of the compound, and the value in the particular compound may be different from the value estimated from the pKa value in different compounds. While it is still possible to measure the pKa value of the dissociative group in the compound by using the methods as described above, systematic understanding is not easy since the correspondence of the pKa value obtained is not easy and the measurement itself may affect the moieties of the compound other than the dissociative group.

In view of the situation as described above, the pKa value of a substituent used in the present invention is not the value actually measured for the compound, but the typical pKa value of the corresponding functional group. In this case, the pKa value is preferably determined by using the pKa value of the dissociative group in a compound suffering from fewer effects of substitution and configuration, namely, a compound having a similar structure near the dissociative group. For example, the pKa value of carboxyl group bonded to benzene ring in Compound A may be represented by the pKa value of benzoic acid (4.2) or the pKa value of a benzoic acid derivative whose substituent and its position are similar to those of the benzene ring in the Compound A. In the present invention, the pKa value used for defining the range of physical properties of the compound is the pKa value in water.

Exemplary monomers represented by the general formula (1) wherein $X_1$ is carboxyl group include trifluoromethyl acrylic acid, acrylic acid, β-methacryloyloxy ethyl hydrogen succinate, β-methacryloyloxyethyl hydrogen phthalate, and also, commercially available products such as 2-acryloyloxy ethyl succinate (HOA-MS manufactured by Kyoeisha Chemical Co., Ltd.), and phthalic acid monohydroxyethyl acrylate (M-5400 manufactured by Toagosei Co., Ltd.).

Exemplary monomers represented by the general formula (1) wherein $X_1$ is an acidic group containing phosphorus atom represented by the general formula (A) include ethyl(meth) acrylate acid phosphate, 3-chloro-2-acid phosphoxy propyl (meth)acrylate, polyoxy ethyleneglycol(meth)acrylate acid phosphate, 2-hydroxyethyl(meth)acrylate acid phosphate, 2-(meth)acryloyloxy ethyl caproate acid phosphate, and also, commercially available products such as Phosmer M (manufactured by Uni-chemical), PM-2 (manufactured by Nippon Kayaku Co., Ltd.), P-1A, P-2A, P-1M, and P-2M (manufactured by Kyoeisha Chemical Co., Ltd.) (these products being ethyl(meth)acrylate acid phosphate); Phosmer CL (3-chloro-2-acid phosphoxy propyl-(meth)acrylate manufactured by Uni-chemical), Phosmer PE (polyoxyethyleneglycol(meth) acrylate acid phosphate manufactured by Uni-chemical), JAP-514 (Johoku Chemical Co., Ltd., 2-hydroxyethyl(meth) acrylate acid phosphate), and PM-21 (2-(meth)acryloyloxy ethyl caproate acid phosphate manufactured by Nippon Kayaku Co., Ltd.).

Exemplary monomers represented by the general formula (1) wherein $X_1$ is an acidic group containing sulfur atom represented by the general formula (B) include 2-acrylamide-2-methyl propane sulfonic acid, styrene sulfonic acid, allyl sulfonic acid vinyl sulfonic acid, and methacryloxy benzene sulfonic acid.

Of the monomers represented by the general formula (1), those wherein $X_1$ is an acidic group containing phosphorus atom represented by the general formula (A) are particularly preferable, and exemplary such monomers include ethyl (meth)acrylate acid phosphate, 3-chloro-2-acid phosphoxy propyl(meth)acrylate, polyoxyethyleneglycol(meth)acrylate acid phosphate, 2-hydroxyethyl(meth)acrylate acid phosphate, 2-(meth)acryloyloxy ethyl caproate acid phosphate, and also, commercially available products such as Phosmer M (manufactured by Uni-chemical), PM-2 (manufactured by Nippon Kayaku Co., Ltd.), P-1A, P-2A, P-1M, and P-2M (manufactured by Kyoeisha Chemical Co., Ltd.) (these products being ethyl(meth)acrylate acid phosphate); Phosmer CL (3-chloro-2-acid phosphoxy propyl-(meth)acrylate manufactured by Uni-chemical), Phosmer PE (polyoxyethyleneglycol (meth)acrylate acid phosphate manufactured by Uni-chemical), JAP-514 (Johoku Chemical Co., Ltd., 2-hydroxyethyl (meth)acrylate acid phosphate), and PM-21 (2-(meth) acryloyloxy ethyl caproate acid phosphate manufactured by Nippon Kayaku Co., Ltd.).

A preferred embodiment of the monomer represented by the general formula (1) is a monomer represented by the following general formula (3):

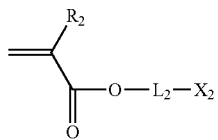

General formula (3)

wherein $R_2$ represents hydrogen atom or an alkyl group, $L_2$ represents an alkylene group preferably containing 1 to 20 carbon atoms, and more preferably 1 to 10 carbon atoms, —O—, —COO—, an arylene group, a group which is a combination of these groups, $X_2$ represents carboxyl group, an acidic group containing phosphorus atom represented by the general formula (A), or an acidic group containing sulfur atom represented by the general formula (B).

In the general formula (3), $R_2$ is hydrogen atom or an alkyl group, and more preferably hydrogen atom or methyl group.

In the general formula (3), $L_2$ is an alkylene group containing 1 to 20 carbon atoms and preferably 1 to 10 carbon atoms, —O—, —COO—, an arylene group such as phenylene group, or a combination thereof.

$X_2$ is carboxyl group, an acidic group containing phosphorus atom represented by the general formula (A), or an acidic group containing sulfur atom represented by the general formula (B). The general formula (A) and the general formula (B) are as defined above for the general formula (1).

The monomer represented by the general formula (3) is preferably the one wherein $X_2$ is an acidic group containing phosphorus atom represented by the general formula (A).

In the organic-inorganic hybrid free standing film according to the present invention, a monomer other than the monomer represented by the general formula (1) may also be used. The monomer used is not particularly limited, and examples of monofunctional monomer are shown in table as described below.

| | |
|---|---|
| acryloyloxy ethyl succinic acid | acryloyloxy ethyl phthalic acid |
| stearyl methacrylate | isobornyl methacrylate |
| hydroxyethyl methacrylate | hydroxypropyl methacrylate |
| propyl methacrylate | butyl methacrylate |
| (poly)ethyleneglycol methacrylate | (poly)propylene glycol methacrylate |
| methacryloylmorpholine | propyl methacrylamide |
| acryloylmorpholine | propyl acrylamide |
| methoxy (poly)propylene glycol methacrylate | ethoxy ethyl methacrylate |
| methacryloyl ethyl phthalate | dimethyl methacrylamide |
| decyl methacrylate | lauryl methacrylate |
| phenoxy ethyl methacrylate | phenoxy polyethylene glycol methacrylate |
| dimethylamino ethyl methacrylate | dimethyl aminopropyl acrylamide |
| methoxy ethyl methacrylate | methoxy (poly)ethyleneglycol methacrylate |
| hydroxy phenoxy propyl methacrylate | methacryloyl ethyl succinate |
| hexyl methacrylate | octyl methacrylate |
| dimethyl acrylamide | dimethylamino ethyl methacrylate |
| cyclohexyl methacrylate | ethyl methacrylate |
| hydroxy butyl methacrylate | ethoxy (poly)propylene glycol methacrylate |
| pentyl methacrylate | dimethyl aminopropyl methacrylamide |
| butoxy ethyl methacrylate | phenoxy methacrylate |
| diethyl methacrylamide | benzyl methacrylate |
| diethyl acrylamide | ethoxy (poly)ethyleneglycol methacrylate |

Examples of polyfunctional monomer are shown in table as described below.

| | |
|---|---|
| 1,4-butanediol diacrylate | 1,6-hexanediol diacrylate |
| trimethylolpropane triacrylate | trimethylolpropane trimethacrylate |
| ethyleneglycol dimethacrylate | diethylene glycol dimethacrylate |
| dipentaerythritol pentaacrylate | dipentaerythritol hexaacrylate |
| polypropylene glycol diacrylate | trimethylolpropane propylene oxide-modified triacrylate |
| pentaerythritol tetraacrylate | polypropylene glycol dimethacrylate |
| bisphenol A ethylene oxide-modified diacrylate | pentaerythritol triacrylate |
| neopentyl glycol diacrylate | tetraethylene glycol diacrylate |
| 1,6-hexanediol dimethacrylate | 1,9-nonanediol diacrylate |
| isocyanuric acid ethylene oxide-modified triacrylate | trimethylolpropane ethylene oxide-modified triacrylate |
| neopentyl glycol dimethacrylate | triethylene glycol dimethacrylate |
| tripropylene glycol diacrylate | trisacryloyloxy ethyl phosphate |

Among these, the preferred are trimethylolpropane trimethacrylate, trimethylolpropane ethylene oxide modified triacrylate, trimethylolpropane propylene oxide modified triacrylate, trisacryloyloxy ethyl phosphate, isocyanuric acid ethylene oxide modified triacrylate, pentaerythritol tetraacrylate, dipentaerythritol pentaacrylate, and dipentaerythritol hexaacrylate.

The organic polymer having a constitutional repeating unit derived from a monomer represented by general formula (1) may be either a linear macromolecule or a three-dimensional polymer network having cross-link points.

The ratio of the monomer represented by the general formula (1) and the monomer other than the one represented by the general formula (1) may be adequately selected depending on the intended use of the product. Preferably, the monomer other than the one represented by the general formula (1) is used at 1 to 10000 parts by weight, and more preferably at 10 to 2000 parts by weight in relation to 100 parts by weight of the monomer represented by the general formula (1) in view of the homogeneous distribution of the organic component and the inorganic component in the resulting free standing film, and improving the content of the inorganic component.

Production of the desired organic-inorganic hybrid free standing film is enabled by simultaneously incorporating the monomer represented by the general formula (1) and the monomer other than the one represented by the general formula (1). In particular, when $X_1$ in the general formula (1) is an acidic group containing phosphorus atom represented by the general formula (A), the desired effect is realized by incorporating a small amount of the monomer represented by the general formula (1), allowing the combined use with various functional monomers. More specifically, even if the functional monomer was the one which can not be hybridized by its single use due to the phase separation from the inorganic component, incorporation of the monomer represented by the general formula (1) at a small amount enables such hybridization, and in this case, the monomer represented by the general formula (1) plays the role of a compatibilizing agent between the organic component and the inorganic component.

The monomer represented by the general formula (1) may comprise one monomer or two or more monomers, and the monomer used may be either a commercially available product or the one synthesized by a known method.

[Metal Alkoxide and its Partial Hydrolytic Condensate]

The organic-inorganic hybrid free standing film according to the present invention contains hydrolytic condensate of a metal alkoxide. A metal alkoxide compound is generally hydrolyzed and condensed by the so-called sol-gel method to produce a hydrolytic condensate which has undergone crosslinking to form a three-dimensional polymer network. More specifically, metal atoms are bonded with each other by an intervening oxygen atom as represented by formula: $M^1$-O-$M^2$: (wherein $M^1$ and $M^2$ respectively represent a metal atom), and a hydrolytic condensate has a crosslinked structure having cross-link points of metal atoms. In the present invention, a hybrid material with the organic polymer is obtained by allowing the sol-gel reaction of the metal alkoxide to proceed in the free standing film. The metal alkoxide as described below may be used alone or in combination of two or more.

The metal alkoxide used in the present invention is not particularly limited, and examples of the metal alkoxide include metal alkoxide containing the metal atom such as silicon, aluminum, titanium, zirconium, tin, or iron. The most preferred is a compound represented by the general formula (4):

[Chemical formula]

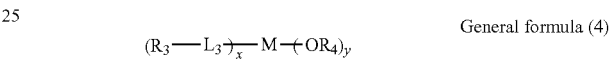

General formula (4)

wherein $R_3$ represents hydrogen atom, a halogen atom, an alkyl group, or an aryl group, $L_3$ represents a divalent linkage group or direct linkage, $R_4$ represents an alkyl group, M represents a metal atom selected from the group consisting of silicon, aluminum, titanium, zirconium, tin, and iron, and x represents an integer of 0 to 2, y represents an integer of 2 to 4, and x+y is equal to the valence of the metal element M.

In the general formula (4), $R_3$ represents hydrogen atom, a halogen atom, an alkyl group, or an aryl group. Exemplary halogen atoms include fluorine atom, chlorine atom, bromine atom, and iodine atom. Exemplary alkyl groups include those preferably containing 1 to 10 carbon atoms, and more preferably 1 to 5 carbon atoms, and examples include methyl group, ethyl group, propyl group, isopropyl group, butyl group, t-butyl group, and pentyl group. Exemplary aryl groups include those preferably containing 6 to 14 carbon atoms such as phenyl group, naphthyl group, and anthracenyl group. The preferred are phenyl group and naphthyl group.

In the general formula (4), $L_3$ represents a divalent linkage group or direct linkage. Exemplary divalent linkage groups include an alkylene group preferably containing 1 to 20 carbon atoms, and more preferably containing 1 to 10 carbon atoms such as methylene group, ethylene group, propylene group, butylene group, pentylene group, and hexylene group, —O—, —S—, an arylene group, —CO—, —NH—, —$SO_2$—, —COO—, —CONH—, —C≡C—, —N=N—, and a group formed by combining these groups such as an alkyleneoxy group, an alkyleneoxy carbonyl group, and an alkylene carbonyloxy group. Among these, the preferred are an alkylene group, —COO—, —O—, —CONH—, and an arylene group. When $L_3$ is direct linkage, $R_3$ in the general formula (4) is directly bonded to Si.

In the general formula (4), $R_4$ represents an alkyl group preferably containing 1 to 10 carbon atoms, and more preferably 1 to 5 carbon atoms such as methyl group, ethyl group, propyl group, isopropyl group, butyl group, t-butyl group, and pentyl group. Among these, the preferred are methyl group, ethyl group, propyl group, isopropyl group, butyl group, and t-butyl group.

In the general formula (4), M represents a metal atom selected from the group consisting of silicon, aluminum, titanium, zirconium, tin, and iron. Among these, the preferred are zirconium and aluminum, and the most preferred is zirconium in view of the favorable reactivity in the hydrolysis and condensation and the high dispersibility of the organic component and the inorganic component in the resulting free standing film.

In the general formula (4), x represents an integer of 0 to 2, and y represents an integer of 2 to 4, and x+y is equal to the valence of the metal element M. More specifically, when M is silicon, titanium, zirconium, tin, or iron, x+y satisfies the relation: x+y=4, and when M is aluminum, x+y satisfies the relation: x+y=3. x is preferably 0 to 1, and more preferably 0, and y is preferably 3 to 4, and more preferably 4.

Exemplary compounds represented by the general formula (4) include an alkoxysilane such as tetramethoxysilane, tetraethoxysilane, tetrapropoxysilane, methyltrimethoxysilane, methyltriethoxysilane, methyltripropoxysilane, or methyltributhoxysilane; an alkoxy aluminum such as triethoxy aluminum, triisopropoxy aluminum, or tributoxy aluminum; an alkoxy titanium, such as tetramethoxy titanium, tetraethoxy titanium, or tetraisopropoxy titanium; an alkoxy zirconium such as tetramethoxy zirconium, tetraethoxy zirconium, or tetrapropoxy zirconium; an alkoxy tin such as tetramethoxy tin, tetraethoxy tin, tetrapropoxy tin, tetraisopropoxy tin, or tetrabutoxy tin; and an alkoxy compound of iron.

The metal alkoxide used in the present invention may be either a commercially available product or the one synthesized by the method known in the art.

The partial hydrolytic condensate of the metal alkoxide is the product of partial hydrolysis and condensation of a metal alkoxide. More specifically, a partial hydrolytic condensate is a compound in which a part and not all of the alkoxy group has undergone hydrolysis or hydrolysis and condensation with some of the unhydrolyzed alkoxide remaining in the molecule. A catalyst such as an acid or a base may be used in the hydrolysis and the condensation. The partial hydrolytic condensate may be a commercially available product or the one synthesized by a method known in the art, and a part of the sol-gel reaction may be allowed to proceed in the solution containing the metal alkoxide as described below to produce the desired partial hydrolytic condensate. The metal alkoxide and its partial hydrolytic condensate may be used either alone or in combination of two or more.

The metal alkoxide and/or its partial hydrolytic condensate according to the present invention may be used under dehydrated atmosphere to eliminate the influence of moisture from the exterior of the reaction system. Alternatively, moisture may be removed from the metal alkoxide and/or its partial hydrolytic condensate according to the present invention before its use, for example, by drying under reduced pressure.

Ratio of the monomer represented by the general formula (1) and the metal alkoxide and/or its partial hydrolytic condensate is not particularly limited. However, the metal alkoxide and/or its partial hydrolytic condensate is preferably used at 0.1 to 8000 parts by weight, more preferably at 1 to 1000 parts by weight, still more preferably at 1 to 500 parts by weight, and most preferably at 20 to 350 parts by weight in relation to 100 parts by weight of the monomer represented by the general formula (1) in view of improving the flexibility and mechanical strength of the resulting free standing film.

In view of improving the flexibility and mechanical strength of the resulting free standing film, molar ratio of the amount of the coordinated group (for example, acidic group containing phosphorus atom represented by the general formula (A)) in the monomer represented by the general formula (1) to the amount of the metal alkoxide is preferably 1 to 200000, more preferably 10 to 20000, and most preferably 25 to 800.

In view of suppressing the cracks in the free standing film, the combination of the monomer represented by the general formula (1) and the metal alkoxide and/or its partial hydrolytic condensate preferable is preferably a combination of the monomer represented by the general formula (3) and the compound in which M in the general formula (4) is silicon, aluminum, titanium, or zirconium. A more preferable combination is the monomer wherein $X_2$ in the general formula (3) is an acidic group containing phosphorus atom represented by the general formula (A) (in particular, phosphoric acid group (—O—PO(OH)$_2$)) and the compound in which M in the general formula (4) is zirconium (an alkoxy zirconium).

[Solvent]

The solvent used for dissolving the monomer represented by the general formula (1) and the metal alkoxide and/or its partial hydrolysate in the coating step as described below is not particularly limited, and the preferable solvents include non-aqueous solvents such as chloroform, dichloromethane, toluene, hexane, xylene, acetone, methyl ethyl ketone, dimethylformamide, dimethyl acetamide, tetramethyl urea, tetraethyl urea, tetrahydrofuran, dioxane, ethanol, and methanol. Among these, the preferred are halogen solvents such as chloroform and dichloromethane and aromatic solvents such as toluene and xylene, which may be used alone or in combination of two or more.

Total solid content in the solution is not particularly limited. However, the total solid content is preferably 1 to 30% by weight, and more preferably 1 to 10% by weight in view of the ease of controlling the film thickness obtained by the coating. The term "total solid content" indicates content of the components that will constitute the free standing film obtained by the coating and curing (such as the monomer represented by the general formula (1), the metal alkoxide, and other monomers), and the solvent is not included.

[Other Components]

The solution containing the monomer represented by the general formula (1) and the metal alkoxide and/or its partial hydrolytic condensate used in the coating may contain a desired amount of other additives (for example, a polymerization initiator and catalyst) to the extent not adversely affecting the object of the present invention.

One exemplary additive is polymerization initiator. The polymerization initiator used may be the one adapted for the type of the polymerization (such as anionic polymerization, cationic polymerization, or radical polymerization) employed in the curing step as described below. Among these, the preferred are radical polymerization initiators, which are not particularly limited, and exemplary radical polymerization initiators include thermal polymerization initiators and photopolymerization initiator. Examples include α-diketones such as benzyl and diacetyl, acyloins such as benzoin, acyloin ethers such as benzoin methyl ether, benzoin ethyl ether, and benzoin isopropyl ether, thioxanthones such as thioxanthone, 2,4-diethylthioxanthone, and thioxanthone-4-sulfonic acid, benzophenores such as benzophenone, 4,4'-bis(dimethylamino)benzophenone, and 4,4'-bis(diethylamino)benzophenone, Michler's ketones, acetophenones such as acetophenone, 2-(4-toluenesulfonyloxy)-2-phenylacetophenone, p-dimethylamino acetophenone, α,α'-dimethoxy acetoxy benzophenone, 2,2'-dimethoxy-2-phenylacetophenone, p-methoxy acetophenone, 2-methyl[4-(methylthio)phenyl]-2-morpholino-1-propanone, and 2-benzyl-2-dimethylamino-1-(4-morpholinophenyl)-butan-1-one, quinones such as anthraquinone and 1,4-naphthoquinone, halogen compounds such as phenacyl chloride, trihalomethylphenylsulfone, and tris(trihalomethyl)-s-triazine, acylphospnine oxides, and peroxides such as di-t-butyl peroxide. Other examples include commercially available products such as Irgacure-184, Irgacure-261, Irgacure-369, Irgacure-500, Irgacure-651, and Irgacure-907 manufactured by Ciba Specialty Chemicals Inc., and Darocur-1173, Darocur-1116, Darocur-2959, Darocur-1664, and Darocur-4043 manufactured by Ciba Specialty Chemicals Inc.

Exemplary other additives include an acid or a base which is used as a catalyst for the sol-gel reaction of the metal alkoxide. Exemplary inorganic acids include hydrochloric acid, hydrogen bromide, hydrogen iodide, sulfuric acid, sulfurous acid, nitric acid, nitrous acid, phosphoric, acid, and phosphorous acid, and exemplary organic acid compounds include carboxylic acids (for example, formic acid, acetic acid, propionic acid, butyric acid, succinic acid, cyclohexane carboxylic acid, octanoic acid, maleic acid, 2-chloropropionic acid, cyano acetic acid, trifluoroacetic acid, perfluorooctanoic acid, benzoic acid, pentafluoro benzoic acid, and phthalic acid), sulfonic acids (for example, methanesulfonic acid, ethanesulfonic acid, trifluoromethanesulfonic acid, p-toluenesulfonic acid, and pentafluorobenzene sulfonic acid), phosphorite acid derivatives (for example, dimethyl phosphate ester and phenylphosphonic acid), Lewis acids (for example, boron trifluoride etherate, scandium triflate, alkyl titanic acid, and aluminic acid), and heteropolyacids (for example, phosphomolybdic acid and phosphotungstic acid).

Examples of the inorganic base include sodium hydroxide, potassium hydroxide, calcium hydroxide, magnesium hydroxide, aluminum hydroxide, and ammonia, and examples of the organic base compound include amines (for example, ethylenediamine, diethylenetriamine, triethylenetetramine, tetraethylenepentamine, triethylamine, dibutylamine, tetramethylethylenediamine, piperidine, piperazine, morpholine, ethanolamine, diazabicycloundecene, quinuclidine, aniline, and pyridine), phosphines (for example, triphenylphosphine and trimethylphosphine), and metal alkoxydes (for example, sodium methylate and potassium ethylate).

The method used for preparing the solution containing the monomer represented by the general formula (1) and the metal alkoxide and/or its partial hydrolytic condensate is not particularly limited, and in an exemplary method, the monomer represented by the general formula (1), the metal alkoxide, and other arbitrary component such as an additive may be fully mixed by an agitator such as a blender.

[Substrate]

The substrate to which the solution comprising the monomer represented by the general formula (1) and the metal alkoxide and/or its partial hydrolytic condensate is applied is coated is not particularly limited. Exemplary substrates include polymer substrates, glass substrates, silicon substrates, and ceramic substrates. The substrate may have any shape adequately selected for the intended application. Preferably, a peel assist layer is provided on the surface of the substrate for easy peeling of the organic-inorganic hybrid thin film obtained in the curing step as described below. The peel assist layer is a layer provided between the film obtained by coating and curing and the substrate. For example, the thin film formed on the substrate may be easily peeled off the substrate by contacting the peel assist layer with a particular solvent which can dissolve the peel assist layer. A polymer which is depolymerized or de-crosslinked by external stimulation such as heating and photoirradiation is also well adapted for use as the peel assist layer.

The material used for the peel assist layer is not particularly limited, and an adequate material may be selected from materials which do not dissolve in the solution containing the monomer represented by the general formula (1) and the metal alkoxide and/or its partial hydrolytic condensate. For example, when the solution is constituted by using a non-aqueous solvent, exemplary materials include polyhydroxy styrene, polyvinyl alcohol, silanol-modified polyvinyl alcohol, carboxy-modified polyvinyl alcohol, styrene-maleic anhydride copolymer and its ester, butadiene-maleic anhydride copolymer, ethylene-maleic anhydride copolymer, isobutylene-maleic anhydride copolymer, polyacrylamide, polystyrenesulfonic acid, polyvinylpyrrolidone, ethylene-acrylic acid copolymer, vinyl acetate-acrylic acid copolymer, oxidized starch, phosphorylated starch, gelatin, carboxymethylcellulose, methylcellulose, sodium alginate, sulfated cellulose, and hydroxyethylcellulose.

[Method for Producing an Organic-Inorganic Hybrid Free Standing Film]

The method for producing the organic-inorganic hybrid free standing film of the present application is not particularly limited. The organic-inorganic hybrid free standing film is preferably produced by a method comprising the following three main steps;

[1] the step of coating a solution containing the monomer represented by the general formula (1) and the metal alkoxide and/or its partial hydrolytic condensate on the substrate to form a film (Step 1),

[2] the step of curing the film formed in Step 1 (Step 2), and

[3] the step of peeling the film cured in Step 2 from the substrate (Step 3).

Next, each step is described in detail.

[Step 1]

Step 1 is the step of coating a solution containing the monomer represented by the general formula (1) and the metal alkoxide and/or its partial hydrolytic condensate on the substrate to form a film (coating film).

The method used for coating is not particularly limited as long as the resulting coating has uniform thickness and smooth surface, and exemplary methods include spin coating, spraying, roll coating, and ink jet method. Among these, the preferred is spin coating in view of the higher uniformity in the thickness of the resulting free standing film. The conditions used for the spin coating may be adequately selected depending on the type of the monomer represented by the general formula (1) and the metal alkoxide used. The spin coating, however, is preferably conducted for 10 to 600 seconds at a rotation speed of 500 to 8000 rpm, and more preferably 2000 to 4000 rpm in view of the higher dispersibility of the organic component and the inorganic component in the resulting free standing film as well as the high productivity. The film formed in this step is the coating film obtained by coating the solution on the substrate, and the resulting coating may also contain the solvent used for the coating.

After the coating, the film may be subjected to an optional drying step. The conditions of the drying used for removing the solvent may be adequately selected depending on the type of starting material, and in a preferred embodiment, the film may be dried at a temperature of 10 to 200° C. for 1 minute to 24 hours.

If desired, a pre treatment, (Pre treatment step) may be conducted before the Step 1 to provide a peel assist layer on the substrate. More specifically, a solution containing the material (such as polyhydroxy styrene) for the peel assist layer is coated on the substrate to form the peel assist layer. The method used for coating is not particularly limited and exemplary methods include spin coating, spraying, roll coating, and ink jet method. Among these, the preferred is spin coating in view of the higher productivity. After the coating, the film may be subjected to an optional drying step. The conditions of the drying used for removing the solvent may be adequately selected depending on the type of starting material, and in a preferred embodiment, the drying may be conducted at a temperature of 10 to 30° C. and a relative humidity of 0.1 to 30% for 60 minutes to 24 hours. More preferably, the drying is conducted in a chamber at a reduced pressure of up to 150 mmHg, and more preferably up to 100 mmHg. Thickness of the peel assist layer is not particularly limited, and optimal thickness may be selected depending on the type of the material. The thickness, however, is preferably 0.1 to 3.0 µm in view of ease of peeling the film formed on the substrate from the substrate.

[Step 2]

Step 2 is a step of curing the film (coating) obtained in Step 1. More specifically, the film (coating) obtained in Step 1 is irradiated with an active energy beam and/or heated to cure the film (coating). In this step, polymerization of the monomer represented by the general formula (1) is promoted by the irradiation of an active energy beam and/or the heating. Simultaneously with this polymerization, hydrolysis and condensation of the metal alkoxide proceeds in the film (coating). In other words, in this step, the polymerization of the monomer and the hydrolysis and condensation of the metal alkoxide simultaneously proceed, in the film (coating), and this results in the formation of a structure in which the organic component and the inorganic component are homogeneously dispersed in nano scale.

The active energy beam used is not particularly limited, and an adequate beam may be selected depending on the monomer used and the polymerization initiator added. Exemplary beams include ultraviolet beam (UV beam), visible light, $\gamma$ ray, $\alpha$ ray, X ray, and electron beam. Among these, the preferred are UV beam and electron beam, and in particular, UV beam in view of handling convenience and ease of obtaining the high energy. Exemplary light sources include LD, LED, fluorescent lamp, low pressure mercury lamp, high pressure mercury lamp, metal halide lamp, carbon arc lamp, xenon lamp, and chemical lamp, and the preferred are LED, high pressure mercury lamp, and metal halide lamp. The conditions used for the irradiation may differ by the light source used, and in a preferred embodiment, the irradiation is conducted at an intensity of 10 to 1000 mW/cm$^2$, and more preferably at 30 to 100 mW/cm$^2$ for 1 to 300 seconds, and more preferably for 30 to 90 seconds.

The conditions used for the heating may be adequately selected depending on the monomer and the metal alkoxide used. In view of the productivity, the heating is preferably conducted at a temperature of 10 to 200° C., and more preferably at 40 to 100° C. for 1 minute to 24 hours, and more preferably for 1 to 240 minutes. The heating may also be accomplished by several separate heating steps each conducted at different set of conditions. The irradiation of the active energy beam and the heating as described above may be conducted either at once or in a sequential manner.

Step 2 may be carried out simultaneously with the Step 1, namely by conducting the irradiation of the active energy beam and/or the heating with the film, formation (coating) of Step 1. More specifically, the irradiation of the active energy beam and/or the heating with the film formation (coating) may be conducted during the spin coating.

[Step 3]

Step 3 is the step in which the film which has been cured in Step 2 is peeled off the substrate. The method used for the peeling is not particularly limited, and the cured film can be mechanically peeled from the substrate by a slight force. When the cured film is not easily peeled from the substrate because of the substrate or the material used for the film, the peeling may be facilitated by a short heat treatment or ultrasonication. When the substrate is soluble in a certain solvent, the substrate having the cured film formed thereon may be treated with such solvent to thereby selectively dissolve the substrate and leave the free standing film.

When the peel assist layer had been formed on the substrate, the substrate having the cured film formed thereon may be brought in contact with the predetermined solvent to thereby dissolve the peel assist layer between the cured film and the substrate and readily obtain the free standing film. Exemplary methods used for contacting the peel assist layer with the solvent include spraying of the solvent from above the cured film and immersion of the substrate in the predetermined solvent, and the preferred is the immersion in view of the ease of peeling. The solvent used may be adequately selected depending on the material of the peel assist layer. For example, when polyhydroxy styrene is used for the peel assist layer, the solvent is preferably ethanol, methanol, water, alkaline water, methyl acetate, or tetrahydrofuran. The solvent may be used at any desired temperature, and a temperature of 10 to 90° C. is preferable in consideration of the productivity.

The Steps 1 to 3 may be conducted in any atmosphere such as air, nitrogen atmosphere, or argon atmosphere. Among these, the preferred are dehydrating atmosphere and deoxygenating atmosphere such as nitrogen atmosphere and argon atmosphere. When these steps are conducted under the conditions of dehydrating atmosphere, the coating solution will be stable, and drastic dehydrating condensation of the metal alkoxide will be suppressed, and the resulting free standing film will have improved uniformity of the thickness and air entrapment in the free standing film can be suppressed. When deoxygenating atmosphere is employed, influence of oxygen quenching of the radical generated by the optical irradiation will be suppressed, and an efficient polymerization of the organic monomer will be promoted.

[Organic-Inorganic Hybrid Free Standing Film]

Thickness of the organic-inorganic hybrid free standing film according to the present invention can be adequately selected by controlling the material and the conditions used for the coating. The thickness is preferably 10 nm to 3 µm, more preferably 30 nm to 2 µm, and most preferably 80 nm to 2 µm in view of the balance between the transparency, flexibility, and mechanical strength. The thickness is an average value which is measured, for example, by directly observing the thickness with an SEM as described in Vendamme, R. et al. (Nature materials, 2006, vol. 5, pp. 494-501), taking thickness measurements at 5 or more random points, and calculating the arithmetical mean of the measurements. Alternatively, the thickness may be measured in accordance with the method described in Vendamme, R. et al. by removing a part of the organic-inorganic hybrid thin film (about 2000 µm× about 1 cm) from the substrate having the thin film formed thereon and measuring the thickness of the part having the thin film removed (area A) and the part having the thin film left thereon (area B) respectively at 5 or more points with a known apparatus (for example, profilemeter P15 manufactured by KLA-Tecnor) and determining the difference between the average value of the area A and the area B as the thickness of the thin film.

The organic-inorganic hybrid free standing film according to the present invention may be cut into various shapes such as circle, square, and rectangle of various sizes by scissors, knife, and the like. The area of the free standing film may be adjusted, for example, by selecting an adequate substrate. The size of the free standing film is preferably in excess of 1 cm$^2$ and preferably 4 to 500 cm$^2$.

As described above, the organic-inorganic hybrid free standing film according to the present invention comprises the organic polymer having a constitutional repeating unit derived from a monomer represented by the general formula (1) and the hydrolytic condensate of a metal alkoxide (inorganic metal oxide) as the main components, and their weight ratio may be adequately controlled.

In consideration of the improved mechanical strength and flexibility, the content (% by weight) of the hydrolytic condensate of a metal alkoxide (inorganic metal oxide) in the free standing film is preferably 0.1 to 50, and more preferably 0.1 to 20 in relation to the total weight of the free standing film. The content of the hydrolytic condensate may be calculated from the amount of the metal alkoxide charged by assuming that all metal alkoxide has become $MO_2$ or $M_2O_3$ (M: metal).

Content (% by weight) of the organic polymer in the free standing film is preferably 50 to 99.9, and more preferably 80 to 99.9 in relation to the total weight of the free standing film.

The organic-inorganic hybrid free standing film according to the present invention can be used in various applications. For example, the organic-inorganic hybrid free standing film according to the present invention can be used for filtration membranes for water such as reverse osmosis membrane (RO membrane), nano filtration membrane (NF membrane), ultrafiltration membrane (UF membrane), and microfiltration membrane (MF membrane), or gas separation, membranes for separating carbon dioxide, oxygen, nitrogen, or hydrogen since it has reduced thickness and strength. The organic-inorganic hybrid free standing film can also be used for an optical film used in liquid crystal display and organic EL display since it is a transparent film having high strength.

As described above, the organic-inorganic hybrid free standing film according to the present invention is obtained by conducting (preferably by simultaneously conducting) the polymerization of the monomer represented by the general formula (1) and the hydrolysis and condensation of the metal alkoxide. The organic component obtained by the polymerization of the monomer and the inorganic component such as the hydrolytic condensate of a metal alkoxide are homogeneously dispersed in nano scale in the free standing film without undergoing the phase separation. More specifically, when a crosslinkable monomer such as a disfunctional monomer is included as the monomer, the organic polymer forms a three dimensional network structure, and an interpenetrating polymer network structure (IPN structure) will be formed with the network structure of an inorganic component formed by the metal alkoxide. When the resulting organic polymer is a linear polymer, a semi-interpenetrating polymer network, structure (semi-TPN structure) will be formed. The free standing film having such interpenetrating polymer network structure or semi-interpenetrating polymer network structure is expected to exhibit improved mechanical strength or flexibility. An "interpenetrating polymer network structure" is a structure in which independent different types of network structures have mutually intruded into and twined with each other without forming mutual chemical bond. A "semi-interpenetrating polymer network structure" is the network structure in which the linear macromolecule has intruded and twined in the matrix of the network structure.

However, in the present invention, it is not necessary that all the organic polymer and the hydrolytic condensate (the inorganic metal oxide) form the structure as described above, and the film may also include the phase solely comprising the organic component or the phase solely comprising the inorganic component as long as the film has necessary transparency, mechanical strength, and flexibility.

As described above, the organic-inorganic hybrid free standing film according to the present invention can be produced by using the monomer represented by the general formula (1) and the metal alkoxide. The resulting free standing film exhibits excellent mechanical strength and flexibility and the formation of cracks has been suppressed. In the observation with a transmission electron microscope (at an acceleration voltage of 200 kV and a magnification of 120,000), the domain of the inorganic component as found in the Vendamme, R. et al. was not observed. In the present invention, incorporation of the monomer represented by the general formula (1) having a particular functional group has resulted in the promotion of the interaction between the organic component and the inorganic component, and this has enabled production of the free standing film having improved performance. More specifically, the promotion of the interaction between the organic component and the inorganic component prevented the phase separation of various components and improved the dispersibility of each component, and hence, contributed for the improvement in the film performance. In particular, when the monomer represented by the general formula (1) has a functional group having a relatively low pKa value (which is most preferably an acidic group containing phosphorus atom represented by the general formula (A)) and the metal atom of the metal alkoxide is a zirconia having high coordination capability, the resulting free standing film has extremely high performance with substantially no cracks. This is presumably because the phosphoric acid group can form ionic bond and coordinate bond with the zirconia atom to further improve the interaction between the organic component and the inorganic component. Presumably, the high hydrolysis and condensation speed of the alkoxy zirconium has also contributed for the highly homogeneous hybridization.

The method for producing the organic-inorganic hybrid free standing film according to the present invention can be used by combining with various functional monomers. More specifically, even for the case of the functional polymer and the hydrolytic condensate of a metal alkoxide which could not be hybridized by conventional methods, incorporation of a small amount of monomer represented by the general formula (1) has enabled the organic component and the inorganic component to be homogeneously distributed in nano-scale in the free standing film without loosing the function of the functional polymer. For example, in the case of a functional polymer film having insufficient mechanical strength, the mechanical strength can be improved without sacrificing its function by using the corresponding functional monomer in combination with the monomer represented by the general formula (1).

EXAMPLES

Next, the present invention is further described by referring to the Examples, which by no means limit the scope of the present invention.

The resulting free standing film was evaluated for its thickness by observation with SEM and using a profilemeter P15 (manufactured by KLA-Tecnor) as described above. Surface hardness (Martens hardness) and Young's modulus as described below were measured by using PICODENTOR HM500 manufactured by Fischer Instrumentation Ltd.

Examples A

Example 1

0.28 g of 2-acryloyloxyethyl succinate (HOA-MS manufactured by Kyoeisha Chemical Co., Ltd.) (a monomer represented by the general formula (1)), 0.70 g of zirconium butoxide ($Zr(OC_4H_9)_4$) (manufactured by Kanto Chemical Co., Inc.) (a metal alkoxide), 2.52 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 1).

10.0 g of polyhydroxystyrene (molecular weight 2700 to 4900, manufactured by Maruzen Petrochemical Co., Ltd.) was dissolved in ethanol (50 ml) to prepare a solution for the peel assist layer (Solution 2). 1.0 ml of this solution 2 for the peel assist layer was dropped onto a glass substrate (6 cm×7 cm) to conduct spin coating under the condition of a slope of 5 seconds and rotation at 3000 rpm for 60 seconds for preparation of a substrate having a peel assist layer. The "slope of 5 seconds" means that, the time required for reaching a rotation speed of 3000 rpm was 5 seconds. The resulting peel assist layer was dried at a reduced pressure, of 10 mmHg for 6 hours.

Next, 1 ml of the solution 1 for the preparation of the organic-inorganic hybrid free standing film was dropped onto the thus formed peel assist layer, and spin coating was conducted under the condition of a slope of 5 seconds and rotation at 4000 rpm for 30 seconds to form a coating film on the peel assist layer. The thus formed film was then irradiated with UV at an intensity of about 40 mW/cm$^2$ for 90 seconds by using a high pressure mercury.

The four corners of the resulting organic-inorganic hybrid thin film was scratched with a knife, and the substrate with the film was immersed in ethanol to dissolve the peel assist layer. The substrate with the film was then immersed in water, and the film floated to the surface of the water, and the organic-inorganic hybrid free standing film having the same size as the thin film that had been formed on the substrate was obtained. The resulting free standing film had a thickness of 1 μm.

Example 2

The procedure of Example 1 was repeated except that phthalic acid monohydroxyethyl acrylate (M-5400 manufactured by Toagosei Co., Ltd.) was used for the monomer represented by the general formula (1) to produce an organic-inorganic hybrid free standing film having the same size as the thin film that had been formed on the substrate. The resulting free standing film had a thickness of 1 μm.

Example 3

The procedure of Example 1 was repeated except that reaction product of 6-hexanolide addition compound of 2-hydroxyethyl methacrylate and anhydrous phosphoric acid (PM-21 manufactured by Nippon Kayaku Co., Ltd.) was used for the monomer represented by the general formula (1) having an acidic group containing phosphorus atom represented by the general formula (A) to produce an organic-inorganic hybrid free standing film having the same size as the thin film that had been formed on the substrate. The resulting free standing film had a thickness of 1 μm.

Comparative Example 1

The procedure of Example 1 was repeated except that TMPTA was used instead of the 2-acryloyloxyethyl succinate for the monomer represented by the general formula (1) in an attempt to produce the organic-inorganic hybrid free standing film. After the curing, cracks were observed in the thin film on the substrate. When the thin film was peeled off the substrate, the thin film was torn, and the free standing film having the same size as the thin film that had been formed on the substrate could not be obtained. The free standing film that had been partly formed had a thickness of 1 μm.

Comparative Example 2

The procedure of Example 1 was repeated except that 4-hydroxybutyl acrylate (HOBuA manufactured by Sigma-Aldrich Japan) was used for the monomer represented by the general formula (1) in an attempt to produce the organic-inorganic hybrid free standing film. After the curing, cracks were observed in the thin film on the substrate. When the thin film was peeled off the substrate, the thin film was torn, and the free standing film having the same size as the thin film that had been formed on the substrate could not be obtained. The free standing film that had been partly formed had a thickness of 1 μm.

Figure 2:
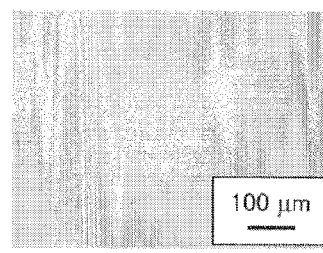
FIG. 2 is a picture taken by an optical microscope for the surface of the free standing film obtained in Example 2.
Figure 3:
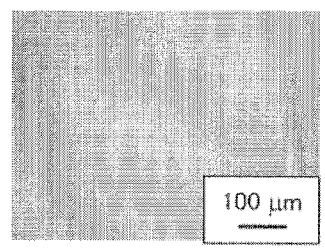
FIG. 3 is a picture taken by an optical microscope for the surface of the free standing film obtained in Example 3.
Figure 4:
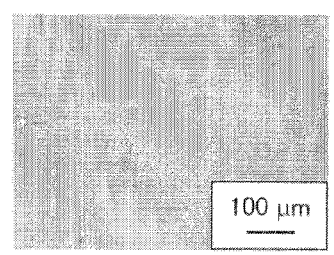
FIG. 4 is a picture taken by an optical microscope for the surface of the free standing film obtained in Comparative Example 1.
Figure 5:
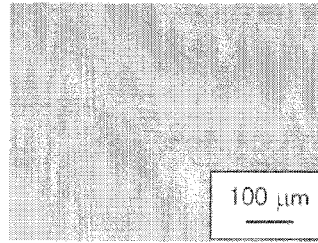
FIG. 5 is a picture taken by an optical microscope for the surface of the free standing film obtained in Comparative Example 2.

The free standing films obtained in the Examples 1 to 3 and Comparative Examples 1 to 2 were evaluated for their surface morphology by visual inspection and microscopic inspection using an optical microscope at a magnification of 50. The results of the observation for Examples 1 to 3 are shown in FIGS. 1 to 3, respectively. The results of the observation for Comparative Examples 1 to 2 are shown in FIGS. 4 and 5, respectively. The results are also shown in Table 1, below.

TABLE 1

| | Monomer represented by the general formula (1) | Preparation of the free standing film | Evaluation of the surface morphology |
|---|---|---|---|
| Example 1 | HOA-MS | Yes | C |
| Example 2 | M-5400 | Yes | C |
| Example 3 | PM-21 | Yes | A |
| Comparative Example 1 | None | No | E |
| Comparative Example 2 | None (HOBuA) | No | D |

Formation of the free standing film was evaluated "Yes" when a free standing film having the same size as the thin film that had been formed on the substrate could be produced, and "No" when failed to produce such film.

The surface morphology was evaluated as described below. In view of practical application to such separator membrane, the film preferably has no cracks with the depth of 10 μm or more.

E; Severe cracks found by visual inspection
D: Cracks with the depth of 10 to 100 μm
C: No cracks with the depth of 10 μm or more
B: No cracks with the depth of 100 nm or more
A: No cracks These results demonstrate that use of the monomer represented by the general formula (1) enables formation of a free standing film having the same size as the thin film that had been formed on the substrate, and in particular, use of PM-21 wherein $X_1$ has an acidic group containing phosphorus atom represented by the general formula (A) enables formation of a uniform free standing film free from cracks.

Figure 6A:
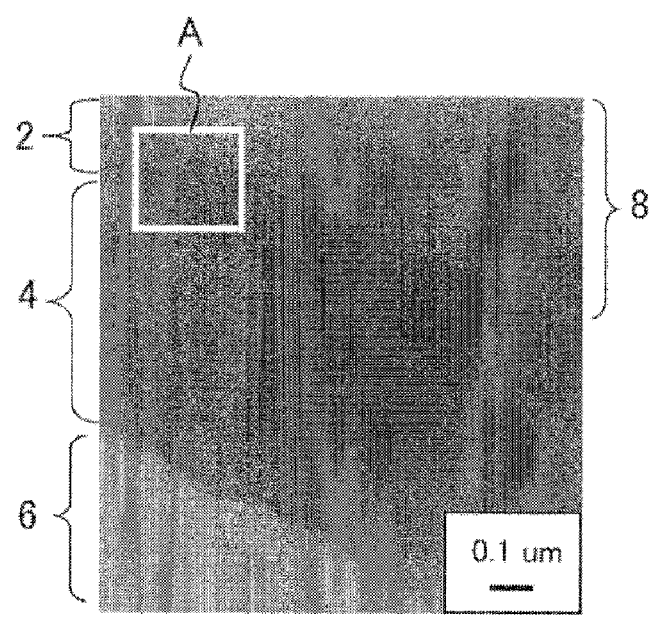
FIGS. 6A and 6B are pictures taken by a transmission electron microscope (TEM) for the section of the free standing film obtained in Comparative Example 2.
Figure 6B:
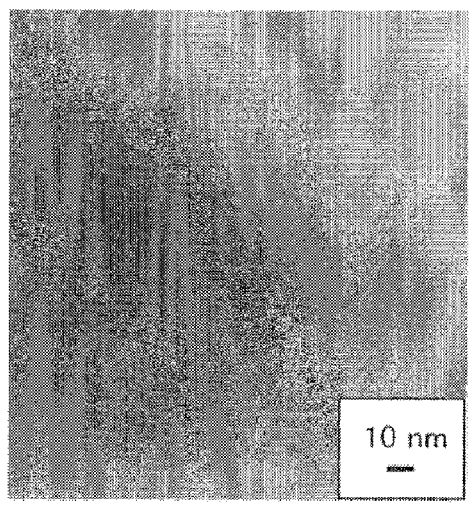
Figure 7A:
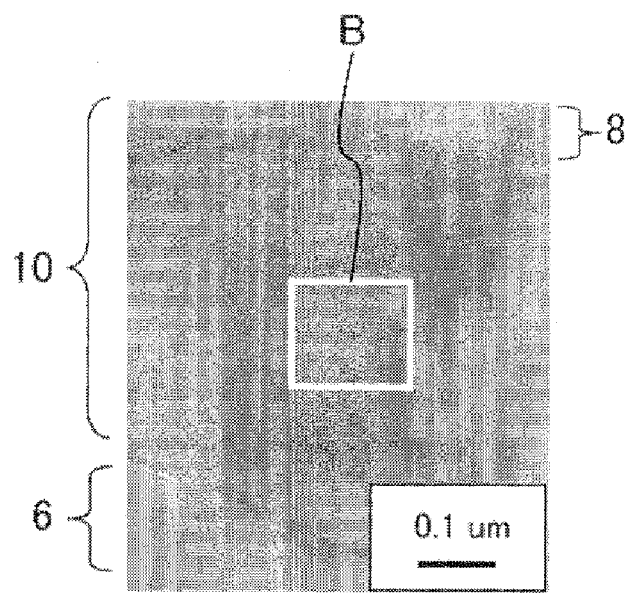
FIGS. 7A and 7B are pictures taken by a transmission electron microscope (TEM) for the section of the free standing film obtained in Example 3.
Figure 7B:
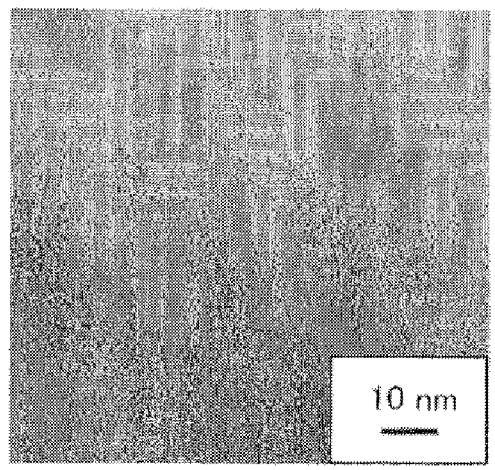
Figure 8:
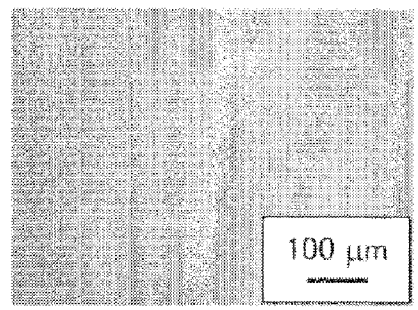
FIG. 8 is a picture taken by an optical microscope for the surface of the free standing film obtained in Example 4.
Figure 9:
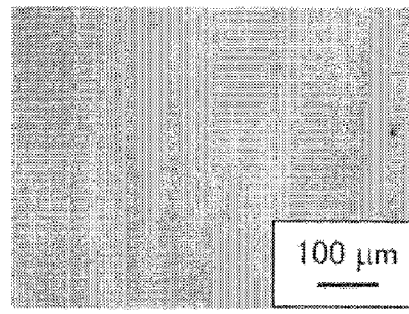
FIG. 9 is a picture taken by an optical microscope for the surface of the free standing film obtained in Example 5.
Figure 10:
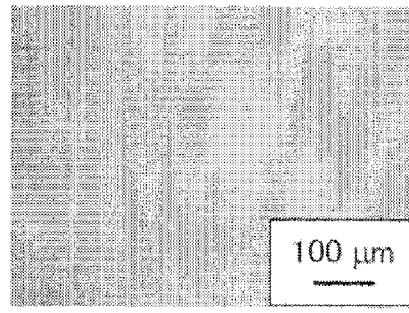
FIG. 10 is a picture taken by an optical microscope for the surface of the free standing film obtained in Example 6.
Figure 11:
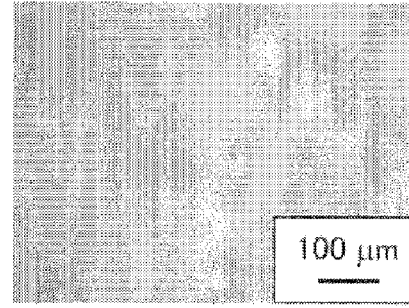
FIG. 11 is a picture taken by an optical microscope for the surface of the free standing film obtained in Example 7.

Cross section of the free standing film obtained in Example 3 and the free standing film obtained in Comparative Example 2 were observed by TEM. More specifically, the peeled hybrid thin film that had been placed on a polyethylene naphthalate film and embedded by epoxy resin was sliced by a microtome to produce a ultrathin section having a thickness of 75 nm for observation by TEM (model HF2200 manufactured by Hitachi High-Technologies Corporation; acceleration voltage, 200 kV). The photomicrograph taken by the TEM for the film of the Comparative Example 2 is shown in FIG. 6, and the photomicrograph taken by the TEM for the free standing film obtained in Example 3 is shown in FIG. 7. As demonstrated in FIGS. 6A and 6B, the organic component and the inorganic component have undergone phase separation in the free standing film in Comparative Example 2, and this means that the desired hybrid free standing film was not obtained by using a monomer having hydroxy group. In contrast, the organic component and the inorganic component are homogeneously distributed without undergoing the phase separation in Example 3 as demonstrated in FIGS. 7A and 7B. The homogeneous distribution of the organic component and the inorganic component is demonstrated in larger magnification in FIG. 7B particularly showing the area indicated by frame B of FIG. 7A.

FIG. 6A shows a PEN (polyethylene naphthalate) substrate 6, a film containing a $ZrO_2$ component 2 and an organic polymer component 4, and an embedding agent (epoxy resin) 8. FIG. 7A shows a PEN (polyethylene naphthalate) substrate 6, an organic-inorganic hybrid free standing film 10, and an embedding agent (epoxy resin) 8.

Examples B

Example 4

1.40 g of the reaction product of 6-hexanolide addition compound of 2-bydroxyethyl methacrylate and anhydrous phosphoric acid (PM-21 manufactured by Nippon Kayaku Co., Ltd.) (a monomer represented by the general formula (1)), 0.70 g of zirconium butoxide ($Zr(OC_4H_9)_4$) (manufactured by Kanto Chemical Co., Inc.) (a metal alkoxide), 1.40 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 4).

The procedure of Example 1 was repeated except that the Solution 4 was used instead of the Solution 1 to produce an organic-inorganic hybrid free standing film having the same size as the thin film that had been formed on the substrate. The resulting free standing film had a thickness of 1 μm.

Example 5

2.52 g of the reaction product of 6-hexanolide addition compound of 2-hydroxyethyl methacrylate and anhydrous phosphoric acid (PM-21 manufactured by Nippon Kayaku Co., Ltd.) (a monomer represented by the general formula (1)), 0.70 g of zirconium butoxide ($Zr(OC_4H_9)_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 5).

The procedure of Example 1 was repeated except that the Solution 5 was used instead of the Solution 1 to produce an organic-inorganic hybrid free standing film having the same size as the thin film that had been formed on the substrate. The resulting free standing film had a thickness of 1 μm.

Example 6

2.52 g of the reaction product of 6-hexanolide addition compound of 2-hydroxyethyl methacrylate and anhydrous phosphoric acid (PM-21 manufactured by Nippon Kayaku Co., Ltd.) (a monomer represented by the general formula (1)), 1.40 g of zirconium butoxide ($Zr(OC_4H_9)_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 6).

The procedure of Example 1 was repeated except that the Solution 6 was used instead of the Solution 1 to produce an organic-inorganic hybrid free standing film having the same size as the thin film that had been formed on the substrate. The resulting free standing film had a thickness of 1 μm.

Example 7

2.52 g of the reaction product of 6-hexanolide addition compound of 2-hydroxyethyl methacrylate and anhydrous phosphoric acid (PM-21 manufactured by Nippon Kayaku Co., Ltd.) (a monomer represented by the general formula (1)), 2.10 g of zirconium butoxide ($Zr(OC_4H_9)_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 7).

The procedure of Example 1 was repeated except that the Solution 7 was used instead of the Solution 1 to produce an organic-inorganic hybrid free standing film having the same size as the thin film that had been formed on the substrate. The resulting free standing film had a thickness of 1 μm.

The free standing films obtained in the Examples 4 to 7 were evaluated for their surface morphology by visual inspection and microscopic inspection using an optical, microscope at a magnification of 50. The results of the observation for Examples 4 to 7 are shown in FIGS. 8 to 11, respectively. The results are also shown in Table 2, below. In Table 2, only TMPTA is included in Comparative Example 1.

TABLE 2

| | Weight ratio of acrylates | | Content of $ZrO_2$ | Preparation of the free standing | Evaluation of the surface |
|---|---|---|---|---|---|
| | TMPTA | PM-21 | (wt %) | film | morphology |
| Example 3 | 9 | 1 | 7.4 | Yes | 5 |
| Example 4 | 5 | 5 | 7.4 | Yes | 5 |
| Example 5 | 1 | 9 | 7.4 | Yes | 5 |
| Example 6 | 1 | 9 | 13.8 | Yes | 5 |
| Example 7 | 1 | 9 | 19.5 | Yes | 5 |
| Comparative Example 1 | Yes | — | 7.4 | No | 1 |

Formation of the free standing film was evaluated "Yes" when a free standing film having the same size as the thin film that had been formed on the substrate could be produced, and "No" when failed to produce such film.

The surface morphology was evaluated as described below. In view of practical application to such separator membrane, the film preferably has no cracks with the depth of 10 μm or more.

E: Severe cracks found by visual inspection
D: Cracks with the depth of 10 to 100 μm
C: No cracks with the depth of 10 μm or more
B: No cracks with the depth of 100 nm or more
A: No cracks These results demonstrate that use of PM-21 having phosphate group for the monomer represented by the general formula (1) with the TMPTA at various ratios enables formation of a uniform free standing film having no cracks.

Examples C

Young's modulus and surface hardness (Martens hardness) of the organic-inorganic hybrid films obtained in the Examples 5, 6, and 7 were calculated by measuring microhardness. More specifically, they were measured at any 5 locations on the organic-inorganic hybrid thin film formed on the substrate by using PICODENTOR HM500 manufactured by Fischer Instrumentation Ltd., and the arithmetical mean of the measurements was calculated. The organic-inorganic hybrid film obtained by the Comparative Example 3 as described below was also evaluated by the same procedure under the same conditions for the purpose of comparison.

Comparative Example 3

2.52 g of the reaction product of 6-hexanolide addition compound of 2-hydroxyethyl methacrylaze and anhydrous phosphoric acid (PM-21 manufactured by Nippon Kayaku Co., Ltd.) (a monomer represented by the general formula (1)), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution.

The procedure of Example 1 was repeated except that the solution as described above was used instead of the Solution 1 to produce an organic free standing film having the same size as the thin film that had been formed on the substrate. The resulting free standing film had a thickness of 1 μm.

The results are shown in Table 3, below.

TABLE 3

|  | $ZrO_2$ content (Vol %) | Young's modulus (GPa) | Hardness (N/mm$^2$) |
|---|---|---|---|
| Example 5 | 1.6 | 3.77 | 167 |
| Example 6 | 3.1 | 4.16 | 205 |
| Example 7 | 4.6 | 4.4 | 232 |
| Comparative Example 3 | 0 | 1.24 | 33 |

In Table 3, $ZrO_2$ content (% by volume) was calculated by using content (% by volume) of the $ZrO_2$ and content (% by weight) of other organic polymers in the free standing film with their density, namely, 1.2 g/cm² for the organic portion and 6.0 g/cm² for the inorganic portion.

It was then found that addition of the $ZrO_2$ at $ZrO_2$ content (% by volume) of about 5% by volume realizes at least 5 fold increase in the hardness and at least 3 fold increase in the Young's modulus compared to the Comparative Example 3.

Examples D

Example 8

2.52 g of a commercially available product PM-2 manufactured by Nippon Kayaku Co., Ltd. represented by the following formula (a monomer represented by the general formula (1)), 0.70 g of zirconium butoxide ($Zr(OC_4H_9)_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured, by Ciba Specialty Chemicals Inc.) were added to chloroform (37 g) to prepare a homogeneous solution to be used in the preparation of the organic-inorganic hybrid free standing film (Solution 8).

The procedure of Example 1 was repeated except that the Solution 8 was used instead of the Solution 1 to produce an organic-inorganic hybrid free standing film having the same size as the thin film that had been formed on the substrate. The resulting free standing film had a thickness of 1 μm.

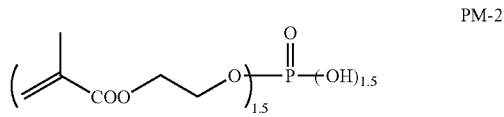

PM-2

PM-2 is a mixture of a compound wherein $n_1$ is 1, $n_2$ is 1, and Ra is H in the general formula (A) and a compound wherein $n_2$ is 1, $n_2$ is 1, and Ra is Ac (methacryloyl group) —O—Y (alkylene group)—in the general formula (A).

Example 9

2.52 g of a commercially available product PM-2 manufactured by Nippon Kayaku Co., Ltd. (a monomer represented by the general formula (1)), 1.40 g of zirconium butoxide ($Zr(OC_4H_9)_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 9).

The procedure of Example 1 was repeated except that the Solution 9 was used instead of the Solution 1 to produce an organic-inorganic hybrid free standing film having the same size as the thin film that had been formed on the substrate. The resulting free standing film had a thickness of 1 μm.

Example 10

2.52 g of a commercially available product PM-2 manufactured by Nippon Kayaku Co., Ltd. (a monomer represented by the general formula (1)), 2.10 g of zirconium butoxide ($Zr(OC_4H_9)_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 10).

The procedure of Example 1 was repeated except that the Solution 10 was used instead of the Solution 1 to produce an organic-inorganic hybrid free standing film having the same size as the thin film that had been formed on the substrate. The resulting free standing film had a thickness of 1 μm.

Comparative Example 4

2.52 g of a commercially available product PM-2 manufactured by Nippon Kayaku Co., Ltd. (a monomer represented by the general formula (1)), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution.

The procedure of Example 1 was repeated except that the solution as described above was used instead of the Solution 1 to produce an organic free standing film having the same size as the thin film that had been formed on the substrate. The resulting free standing film had a thickness of 1 μm.

Young's modulus and surface hardness (Martens hardness) of the organic-inorganic hybrid films obtained in the Examples 8, 9, and 10 and Comparative Example 4 were calculated by measuring microhardness. More specifically, they were measured at any 5 locations on the organic-inorganic hybrid thin film formed on the substrate by using PICODENTOR HM500 manufactured by Fischer Instrumentation Ltd., and the arithmetical mean of the measurements was calculated.

The results are shown in Table 4, below,

TABLE 4

|  | $ZrO_2$ content (Vol %) | Young's modulus (GPa) | Hardness (N/mm$^2$) |
| --- | --- | --- | --- |
| Example 8 | 1.6 | 3.14 | 139 |
| Example 9 | 3.1 | 6.68 | 329 |
| Example 10 | 4.6 | 9.37 | 494 |
| Comparative Example 4 | 0 | 0.54 | 14 |

In Table 4, $ZrO_2$ content (% by volume) was calculated by using content (% by volume) of the $ZrO_2$ and content (% by weight) of other organic polymers in the free standing film with their density, namely, 1.2 g/cm$^2$ for the organic portion and 6.0 g/cm$^2$ for the inorganic portion.

It was then found that addition of the $ZrO_2$ at $ZrO_2$ content (% by volume) of about 5% by volume realizes at least 10 fold increase in the hardness and at least 6 fold increase in the Young's modulus compared to the Comparative Example 4 when PM-2 was used for the monomer represented by the general formula (1), Examples E Example 11

2.52 g of a commercially available product F-2M manufactured by Nippon Kayaku Co., Ltd. represented by the following formula (a monomer represented by the general formula (1)), 0.70 g of zirconium butoxide (Zr(OC$_4$H$_9$)$_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 11).

The procedure of Example 1 was repeated except that the Solution 11 was used instead of the Solution 1 to produce an organic-inorganic hybrid free standing film having the same size as the thin film that had been formed on the substrate. The resulting free standing film had a thickness of 1 μm.

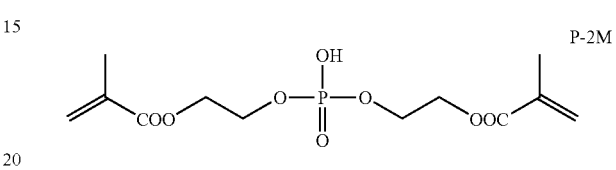

Example 12

2.52 g of a commercially available product P-2M manufactured by Nippon Kayaku Co., Ltd. (a monomer represented by the general formula (1)), 1.40 g of zirconium butoxide (Zr(OC$_4$H$_9$)$_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 12).

The procedure of Example 1 was repeated except that the Solution 12 was used instead of the Solution 1 to produce an organic-inorganic hybrid free standing film having the same size as the thin film that had been formed on the substrate. The resulting free standing film had a thickness of 1 μm.

Example 13

2.52 g of a commercially available product P-2M manufactured by Nippon Kayaku Co., Ltd. (a monomer represented by the general formula (1)), 2.10 g of zirconium butoxide (Zr(OC$_4$H$_9$)$_4$) (manufactured by Kanto Chemical Co., Inc.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 13).

The procedure of Example 1 was repeated except that the Solution 13 was used, instead of the Solution 1 to produce an organic-inorganic hybrid free standing film having the same size as the thin film that had been formed on the substrate. The resulting free standing film had a thickness of 1 μm.

Comparative Example 5

2.52 g of a commercially available product P-2M manufactured by Nippon Kayaku Co., Ltd. (a monomer represented by the general formula (1)), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution.

The procedure of Example 1 was repeated except that the solution as described above was used instead of the Solution 1 to produce an organic free standing film having the same size as the thin film that had been formed on the substrate. The resulting free standing film had a thickness of 1 µm.

Young's modulus and surface hardness (Martens hardness) of the organic-inorganic hybrid films obtained in the Examples 11, 12, and 13 and Comparative Example 5 were calculated by measuring microhardness. More specifically, they were measured at any 5 locations on the organic-inorganic hybrid thin film formed on the substrate by using PICO-DENTOR HM500 manufactured by Fischer Instrumentation Ltd., and the arithmetical mean of the measurements was calculated.

The results are shown in Table 5, below.

TABLE 5

| | $ZrO_2$ content (Vol %) | Young's modulus (GPa) | Hardness (N/mm$^2$) |
|---|---|---|---|
| Example 11 | 1.6 | 3.6 | 159 |
| Example 12 | 3.1 | 8.16 | 402 |
| Example 13 | 4.6 | 7.81 | 412 |
| Comparative Example 5 | 0 | 0.97 | 26 |

In Table 5, $ZrO_2$ content (% by volume) was calculated by using content (% by volume) of the $ZrO_2$ and content (% by weight) of other organic polymers in the free standing film with their density, namely, 1.2 g/cm$^2$ for the organic portion and 6.0 g/cm$^2$ for the inorganic portion.

It was then found that addition of the $ZrO_2$ at $ZrO_2$ content (% by volume) of about 5% by volume realizes at least 20 fold increase in the hardness and at least 8 fold increase in the Young's modulus compared to the Comparative Example 4 when P-2M was used for the monomer represented by the general formula (1).

Examples F

Example 14

2.52 g of the reaction product of 6-hexanolide addition compound of 2-hydroxyethyl methacrylate and anhydrous phosphoric acid (PM-21 manufactured by Nippon Kayaku Co., Ltd.), 0.70 g of aluminum sec-butoxide (Al(OCH(CH$_3$)C$_2$H$_5$)$_3$) (manufactured by Tokyo Kasei Kogyo Co., Ltd.) (a metal alkoxide), 0.28 of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 14).

The procedure of Example 1 was repeated except that the Solution 14 was used instead of the Solution 1 to produce an organic-inorganic hybrid free standing film having the same size as the thin film that had been formed on the substrate. The resulting free standing film had a thickness of 1 µm.

Example 15

2.52 g of the reaction product of 6-hexanclide addition compound of 2-hydroxyethyl methacrylate and anhydrous phosphoric acid (PM-21 manufactured by Nippon Kayaku Co., Ltd.), 1.40 g of aluminum sec-butoxide (Al(OCH(CH$_3$)C$_2$H$_5$)$_3$) (manufactured by Tokyo Kasei Kogyo Co., Ltd.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 15).

The procedure of Example 1 was repeated except that the Solution 15 was used instead of the Solution 1 to produce an organic-inorganic hybrid free standing film having the same size as the thin film that had been formed on the substrate. The resulting free standing film had a thickness of 1 µm.

Example 16

2.52 g of the reaction product of 6-hexanolide addition compound of 2-hydroxyethyl methacrylate and anhydrous phosphoric acid (PM-21 manufactured by Nippon Kayaku Co., Ltd.), 2.10 g of aluminum sec-butoxide (Al(OCH(CH$_3$)C$_2$H$_5$)$_3$) (manufactured by Tokyo Kasei Kogyo Co., Ltd.) (a metal alkoxide), 0.28 g of trimethylolpropane triacrylate (TMPTA manufactured by Daicel-Cytec Company LTD.), and 0.20 g of UV polymerization initiator (Irgacure 907 manufactured by Ciba Specialty Chemicals Inc.) were added to chloroform (37 g) to prepare a homogeneous solution to be used in the preparation of the organic-inorganic hybrid free standing film (Solution 16).

The procedure of Example 1 was repeated except that the Solution 16 was used instead of the Solution 1 to produce an organic-inorganic hybrid free standing film having the same size as the thin film that had been formed on the substrate. The resulting free standing film had a thickness of 1 µm.

Young's modulus and surface hardness (Martens hardness) of the organic-inorganic hybrid films obtained in the Examples 14, 15, and 16 and Comparative Example 3 were calculated by measuring microhardness. More specifically, they were measured at any 5 locations on the organic-inorganic hybrid thin film formed on the substrate by using PICO-DENTOR HM500 manufactured by Fischer Instrumentation Ltd., and the arithmetical mean of the measurements was calculated.

The results are shown in Table 6, below.

TABLE 6

| | $Al_2O_3$ content (Vol %) | Young's modulus (GPa) | Hardness (N/mm$^2$) |
|---|---|---|---|
| Example 14 | 1.6 | 3.15 | 151 |
| Example 15 | 3.1 | 3.57 | 171 |
| Example 16 | 4.6 | 3.74 | 179 |
| Comparative Example 3 | 0 | 1.24 | 33 |

In Table 6, $Al_2O_3$ content (% by volume) was calculated by using content (% by volume) of the $Al_2O_3$ end content (% by weight) of other organic polymers in the free standing film with their density, namely, 1.2 g/cm$^2$ for the organic portion and 3.9 g/cm$^2$ for the inorganic portion.

It was then found that addition of the $Al_2O_3$ at $Al_2O_3$ content (% by volume) of about 5% by volume realizes at least 5 fold increase in the hardness and at least 3 fold increase in the Young's modulus compared to the Comparative Example 3 when $Al_2O_3$ was used for the metal alkoxide.

Example G

The procedure of Example 3 was repeated except that the ratio (molar ratio) of the TMPTA to the PM21 used in the Example 3 was changed to those shown in Table 7 for Examples 17 and 18 to produce organic-inorganic hybrid free standing films each having the same size as the thin film that had been formed on the substrate. The resulting free standing films had a thickness of 1 μm.

TABLE 7

| | Molar ratio | | | Young's modulus (GPa) | Hardness (N/mm$^2$) |
|---|---|---|---|---|---|
| | TMPTA | PM-21 | Zr(OC$_4$H$_9$)$_4$ | | |
| Example 3 | 4.7 | 0.35 | 1.0 | 7.03 | 310 |
| Example 17 | 3.2 | 0.8 | 1.0 | 6.42 | 315 |
| Example 18 | 3.0 | 1.0 | 1.0 | 5.99 | 306 |

As demonstrated in Table 7, the hardness and the Young's modulus can be controlled to the desired ranges by controlling molar ratio of the PM-21 (a compound represented by the general formula (1)) which can coordinate with the metal to the metal atom from the Zr(OC$_4$H$_3$)$_4$.

What is claimed is:

1. An organic-inorganic hybrid free standing film comprising an organic polymer and a hydrolytic condensate of a metal alkoxide, the organic polymer comprising a repeating unit derived from a monomer represented by general formula (1):

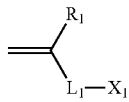

General formula (1)

wherein,

R$_1$ represents a hydrogen atom or an alkyl group,

L$_1$ represents a divalent linkage group or direct linkage, and

X$_1$ represents an acidic group containing phosphorus atom represented by the general formula (A):

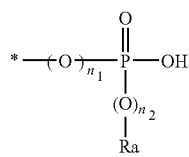

General formula (A)

wherein,

Ra represents a hydrogen atom, a substituent containing no polymerizable group, or Ac—O—Y—, n$_1$ and n$_2$ independently represent an integer of 0 or 1,

* indicates binding position with the L$_1$,

Ac represents an acryloyl group or a methacryloyl group,

Y represents an alkylene group, an alkyleneoxy group, an alkyleneoxycarbonyl group, an alkylenecarbonyl group, or a combination of such groups, or X$_1$ represents an acidic group containing sulfur atom represented by the general formula (B):

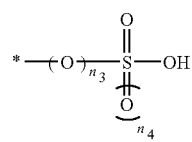

General formula (B)

wherein, n$_3$ and n$_4$ independently represent an integer of 0 or 1, and

* indicates a binding position with the L$_1$.

2. The organic-inorganic hybrid free standing film according to claim 1, wherein a metal atom in the metal alkoxide is at least one metal atom selected from the group consisting of: silicon, titanium, zirconium, aluminum, tin, and iron.

3. The organic-inorganic hybrid free standing film according to claim 1, wherein the organic-inorganic hybrid free standing film has a thickness of 10 nm to 3 μm.

4. An organic-inorganic hybrid free standing film produced by a method comprising the steps of:

coating a solution on a substrate to form a film, the solution comprising:

a metal alkoxide and/or its partial hydrolytic condensate, and a monomer represented by the by general formula (I):

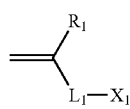

General formula (1)

wherein,

R$_1$ represents hydrogen atom or an alkyl group,

L$_1$ represents a divalent linkage group or direct linkage, and

X$_1$ represents an acidic group containing phosphorus atom represented by the general formula (A):

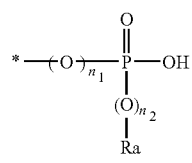

General formula (A)

wherein,

Ra represents a hydrogen atom, a substituent containing no polymerizable group, or Ac—O—Y—, n$_1$ and n$_2$ independently represent an integer of 0 or 1,

* indicates a binding position with the L$_1$,

Ac represents an acryloyl group or methacryloyl group,

Y represents an alkylene group, an alkyleneoxy group, an alkyleneoxycarbonyl group, an alkylenecarbonyl group, or a combination of such groups, or $X_1$ represents an acidic group containing sulfur atom represented by the general formula (B):
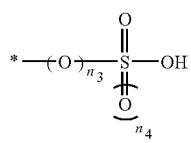
General formula (B)
wherein,
$n_3$ and $n_4$ independently represent an integer of 0 or 1, and
* indicates a binding position with the $L_1$
curing the film; and
peeling the cured film from the substrate to obtain the organic-inorganic hybrid free standing film.
* * * * *